United States Patent [19]

Mazzarella et al.

[11] Patent Number: 5,771,303
[45] Date of Patent: Jun. 23, 1998

[54] MICROPHONE MOUNTING AND CONTROL SYSTEM

[76] Inventors: Charles W. Mazzarella, 84 E. Garfield Ave.; Frederick J. Rast, III, 49 Eighth Ave., both of Atlantic Highlands, N.J. 07716

[21] Appl. No.: 450,103

[22] Filed: May 25, 1995

[51] Int. Cl.⁶ ..................................... H04R 25/00
[52] U.S. Cl. .......................... 381/169; 381/168; 455/90; 455/91; 455/99
[58] Field of Search .............................. 381/159, 86, 91, 381/122, 168, 169; 455/90, 91, 96, 99, 569, 550, 575

[56] References Cited

U.S. PATENT DOCUMENTS

| | | | |
|---|---|---|---|
| 3,020,368 | 2/1962 | Nielsen | 381/168 |
| 4,060,697 | 11/1977 | Neal | 381/168 |
| 4,151,468 | 4/1979 | Kerr | 381/168 |
| 4,215,250 | 7/1980 | Resener | 381/169 |
| 4,325,143 | 4/1982 | Kerr | 381/168 |
| 4,818,010 | 4/1989 | Dillon | 296/37.7 |
| 5,453,567 | 9/1995 | Brinson | 84/104 |
| 5,525,963 | 6/1996 | Purssey | 340/540 |
| 5,548,810 | 8/1996 | Riddell et al. | 455/99 |

FOREIGN PATENT DOCUMENTS 0141838   11/1980   Japan ...................................... 381/169

*Primary Examiner*—Paul Loomis
*Assistant Examiner*—Rexford Barnie
*Attorney, Agent, or Firm*—Thomason & Moser

[57] ABSTRACT

The system is a microphone mounting and control system for the hands-free operation of a microphone of a two-way radio by a driver of a vehicle. The system comprises a universal microphone holder, a flexible support member mounted to the interior roof of the vehicle for supporting the microphone holder, an electrically operated actuator for applying pressure to the trigger of the microphone and an electrical foot-operated switch for operating the actuator. The electrically operated actuator comprises a dual coil piston solenoid and an encased cable. The foot-operated switch activates the solenoid, thereby applying the activator against the trigger of the microphone. Hence, a driver is able to transmit a message through the microphone without the use of his hands for operating a trigger in the conventional prior art manner, which is highly undesirable in the event of an emergency situation.

20 Claims, 8 Drawing Sheets

MICROPHONE MOUNTING AND CONTROL SYSTEM

FIELD OF THE INVENTION

The present invention relates to a microphone mounting and control system for the operation of a two-way radio by a driver of a vehicle. More particularly, the invention relates to a system that enables hands-free operation of a two-way radio so that the driver may continue to operate the vehicle with both hands on the steering wheel.

BACKGROUND OF THE INVENTION

Two-way radios or citizens band transceivers are frequently installed in motor vehicles. They are extensively used in commercial and emergency vehicles such as police cruisers, ambulances, fire trucks, taxi cabs and commercial trucks. The operation of these two-way radios generally requires the driver to hold the microphone in his or her hand. In order to transmit a message, a lever or trigger on the microphone is depressed as the driver speaks into the microphone.

However, this practice increases the risk of a collision when the driver is subjected to a sudden emergency situation while operating the two-way radio. With only one hand on the steering wheel, there is an inherent risk that the driver may lose control of the motor vehicle. Specifically, police officers are frequently exposed to such emergency situations. During high speed car pursuits, a police officer is generally required to continuously relate his position and/or a description of the suspects to other police officers or to headquarters. Hence, it is common that a police officer is required to operate the two-way radio throughout the pursuit. Under such extreme conditions, operating the two-way radio with one hand and steering the police cruiser with the other hand significantly compromises the safety of a police officer.

Over the years, various microphone mounting systems have been developed to address this problem. Examples of such devices are described in U.S. Pat. No. 4,151,468 issued on Apr. 24, 1979 and U.S. Pat. No. 4,325,143 issued on Apr. 13, 1982. Both patents are issued to Leslie I. Kerr. Kerr discloses a microphone holder frame for receiving a microphone from a two-way radio. A support member mounted to a seat of the vehicle supports the holder frame. Alternatively, the support member may simply lie on top of the seat of the vehicle. The activation of the trigger of the microphone is accomplished by applying pressure on a foot pedal, which manually applies a rod with a knob against the trigger of the microphone. However, these devices lack stability and obstruct the movement of the driver's foot, thereby creating hazards for the driver of the vehicle. Since these devices are manually operated, a large amount of force must also be applied to the foot pedal for overcoming the friction of moving the rod or cable. In addition, the placement of the support member on the seat of the vehicle impedes the lateral movement of the driver.

Another variation of a microphone mounting system is described in U.S. Pat. No. 4,060,697 issued on Nov. 29, 1977 to Willie Neal. Neal discloses a microphone holder mounted to the dashboard of a vehicle. The control for this device, which resembles a thumb lever, is mounted to a control arm attached to the steering column. A cable connects the thumb lever to the holder. Applying pressure to the thumb lever activates the trigger of the microphone. This device is designed for vehicles modified for the handicapped. As such, the control arm is not present in regular vehicles and the operation of this device still requires the driver to have one hand on the steering wheel with the other hand on the control arm. Furthermore, the placement of this device on the dashboard impedes normal steering of the vehicle and creates the hazard of impacting the driver in a head-on collision.

Therefore, a need exists in the art for a microphone mounting and control system for the hands-free operation of a two-way radio by a driver of a vehicle.

SUMMARY OF THE INVENTION

The present invention is a microphone mounting and control system for the hands-free operation of a microphone of a two-way radio (or other transceivers or public address (PA) system) by a driver of a vehicle. The system comprises a universal microphone holder, a flexible support member mounted to the interior roof of the vehicle for supporting the microphone holder, an electrically operated actuator for applying pressure to the trigger of the microphone and an electrical foot-operated switch for operating the actuator.

The universal microphone holder is a metal frame for receiving all current configurations of microphones for two-way radios. The universal microphone holder comprises a base, an activator and a microphone securing member. The base is substantially rectangular in shape and contains an elongated groove for receiving the clip button located on the back of conventional microphones. With the clip button engaged within the elongated groove, the securing member with a pair of pins is applied to the back of the base to firmly secure the microphone to the base. The activator is pivotally coupled to the base for engaging the trigger of the microphone.

The flexible support member comprises a flexible shaft and a swivel base which is attached to the interior roof of the vehicle. The swivel base mounts directly to the same location that the vehicle interior compartment light is located.

The electrically operated actuator comprises a dual coil piston solenoid and an encased cable. The encased cable connects the solenoid directly to the activator of the microphone holder. When activated, the solenoid retracts the encased cable causing the activator to pivot on the base portion, thereby engaging the trigger of the microphone. Furthermore, the solenoid is secured inconspicuously to the floor of a vehicle directly below a seat.

Finally, an electrical foot-operated switch is adapted to the floor board on the driver's side of a motor vehicle for convenient and easy operation by one foot of the driver. The foot-operated switch activates the solenoid, thereby applying the activator against the trigger of the microphone. Hence, a driver is able to transmit a message through the microphone without the use of his hands for operating a trigger in the conventional prior art manner, which is highly undesirable in the event of an emergency situation.

In accordance with another aspect of the present invention, an additional electrical switch is adapted above the window on the interior driver's side of the vehicle. Specifically, this configuration provides an additional switch for a police officer to activate the two-way radio or an PA system, while he is taking a defensive position behind the door of the police cruiser and holding his weapon during a felony traffic stop.

In accordance with another aspect of the present invention, a channel guard/private line switch is adapted to the base portion of the microphone holder. The channel guard switch operates a channel isolation feature of a two-way radio. Specifically, when a microphone of a police radio is placed within its original holder, the channel isolation feature prevents the police radio from receiving transmissions from other police departments operating on the same channel. The channel guard switch effectively maintains the channel isolation feature of the police radio when the microphone is transferred from its original holder to the universal microphone holder of the present invention.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
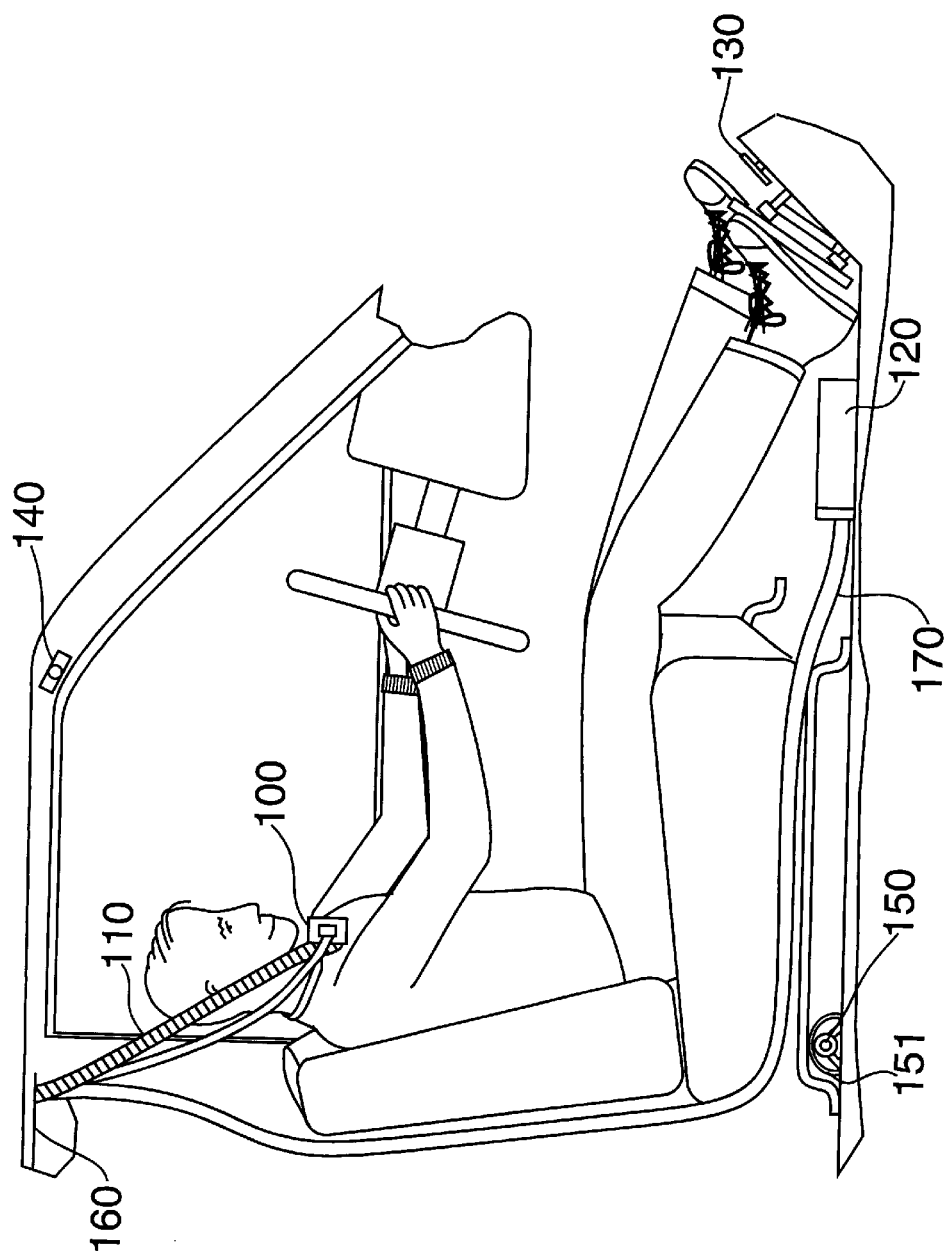
FIG. 1 illustrates a side view of the interior of a vehicle with a driver and shows the preferred embodiment of a microphone mounting and control system of the present invention.

FIG. 1 depicts the microphone mounting and control system of the present invention mounted inside a vehicle. It also illustrates the relationship between the driver of the vehicle, the two-way radio 120 and the microphone mounting and control system of the present invention. The system comprises a universal microphone holder 100 for receiving a microphone, a flexible support member 110 mounted to the interior roof 160 of the vehicle for supporting the microphone holder 100, an electrically operated actuator 150 for applying pressure to the trigger of the microphone and an electrical foot-operated switch 130 for operating the actuator 150. In addition, an electrical switch 140 is adapted above the window on the interior driver's side of the vehicle.

The flexible support member 110 is mounted directly to the same location on the interior roof of the vehicle where the passenger compartment light is located. Thus, the flexible support member 110 is positioned substantially in the center of the passenger compartment and slightly behind the driver. This preferred placement of the flexible support member 110 permits a driver to easily manipulate the microphone holder 100 into any desired position. An ideal position for the microphone holder 100 is at the shoulder level of the driver and slightly to the driver's right side. This ideal placement of the microphone (not shown in FIG. 1) permits clear transmission of messages by the driver without obstructing the driver's view. Furthermore, the pliable nature of the flexible support member 110 permits the safe operation of the microphone without impeding the effectiveness of safety devices such as air bags.

The electrically operated actuator 150 comprises a dual coil piston solenoid and an encased cable (not shown in FIG. 1). The encased cable connects the solenoid directly to the activator of the microphone holder 100. In the preferred embodiment of the present invention, the encased cable and the electrical wiring for the solenoid are safely concealed in the side supports and/or roof of the interior passenger compartment. Similarly, the microphone cable 170 may also be extended and concealed in the passenger compartment in the same manner. Alternatively, these cables and wires are mounted to a security screen (not shown) which is present in police cruisers for dividing a passenger compartment into a driver compartment and a prisoner compartment. Furthermore, the solenoid is secured inconspicuously to the floor of a vehicle directly below a seat. This unobtrusive placement of the present invention enhances its functionality without introducing obstructions into the passenger compartment of a vehicle.

The microphone mounting and control system of the present invention incorporates an electrical foot-operated switch 130, which is mounted to the floor board on the driver's side of a motor vehicle. The foot-operated switch 130 is generally positioned to the left of the brake pedal for easy operation by the left foot of the driver (although not specifically so limited). This configuration is particularly advantageous because a driver's left foot is customarily unused in motor vehicles with automatic transmissions. Nevertheless, the present invention is still effective in vehicles with manual transmissions where the driver's left foot is only used intermittently for engaging a clutch pedal.

By closing the foot-operated switch 130, the solenoid retracts the encased cable, thereby applying the activator against the trigger of the microphone. The foot-operated switch 130 is a switch that does not lock into an "on" or "off" position, but merely forms an electrical connection when the switch is depressed (e.g. a momentary contact switch). Therefore, a driver must continuously apply pressure on the foot-operated switch 130 while transmitting a message. Upon release of the foot-operated switch 130, the trigger of the microphone is released and the two-way radio returns to a non-transmission mode. Thus, a driver is able to transmit a message through the microphone without the use of his hands for operating a trigger in the conventional prior art manner.

Furthermore, an optional electrical switch 140 is adapted above the window on the interior driver's side of the vehicle. Specifically, this additional switch permits a police officer to activate the two-way radio 120 while he is exiting the police cruiser or taking a defensive position behind the door of the police cruiser. Microphones of modern two-way radios are extremely sensitive and are able to receive a voice signal from several feet away. As such, a police officer standing along side the police cruiser with the window lowered can effectively transmit a message by activating the optional electrical switch 140 while he is outside the police cruiser. However, those skilled in the art will clearly realize that optional switches can be employed throughout a vehicle to provide additional points of activation of the microphone to address different requirements. For example, an optional electrical switch (hand-operated or foot-operated) can be provided in the cab portion of an ambulance to permit a paramedic to transmit a message while attending to an accident victim.

FIGS. 2–5 illustrate the universal microphone holder 100 of the present invention. The universal microphone holder 100 is a metal frame for receiving all current configurations of microphone 200 for a two-way radio. In the preferred embodiment of the present invention, the microphone holder 100 is constructed from aluminum. However, other suitable materials possessing sufficient rigidity may also be employed.

The universal microphone holder 100 comprises a base 220, an activator 230, a microphone securing member 300 and a base adapter 320. The base 220 is substantially rectangular in shape (although not specifically so limited) and contains an elongated groove 222 for receiving the clip button 310 located on the back of a conventional microphone 200. The elongated groove 222 is shaped such that it may receive clip buttons of different sizes. The clip button 310 is substantially cylindrical in shape with a constricted portion 312. The elongated groove 222 opens from one end of the base portion 220 where clip button 310 is slidably received. A restraining portion 223 engages the restricted portion 312 of the clip button 310, thereby limiting the movement of the microphone to the length of the elongated groove 222. The elongated groove 222 is of sufficient length such that a microphone 200 is positioned substantially in the center of microphone holder 100.

Figure 3:
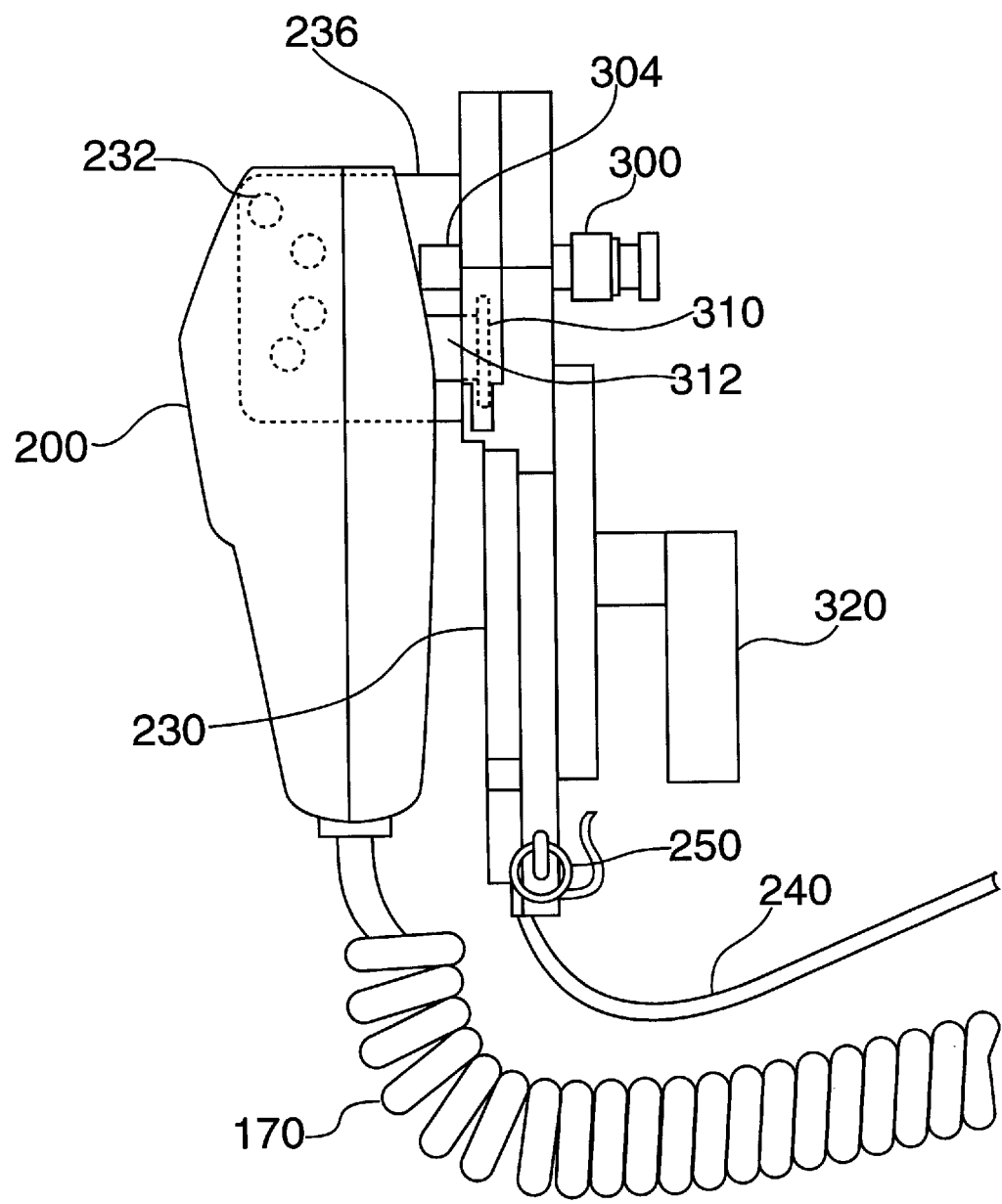
FIG. 3 illustrates a side view of a microphone mounted to the microphone holder of the present invention.
Figure 5:
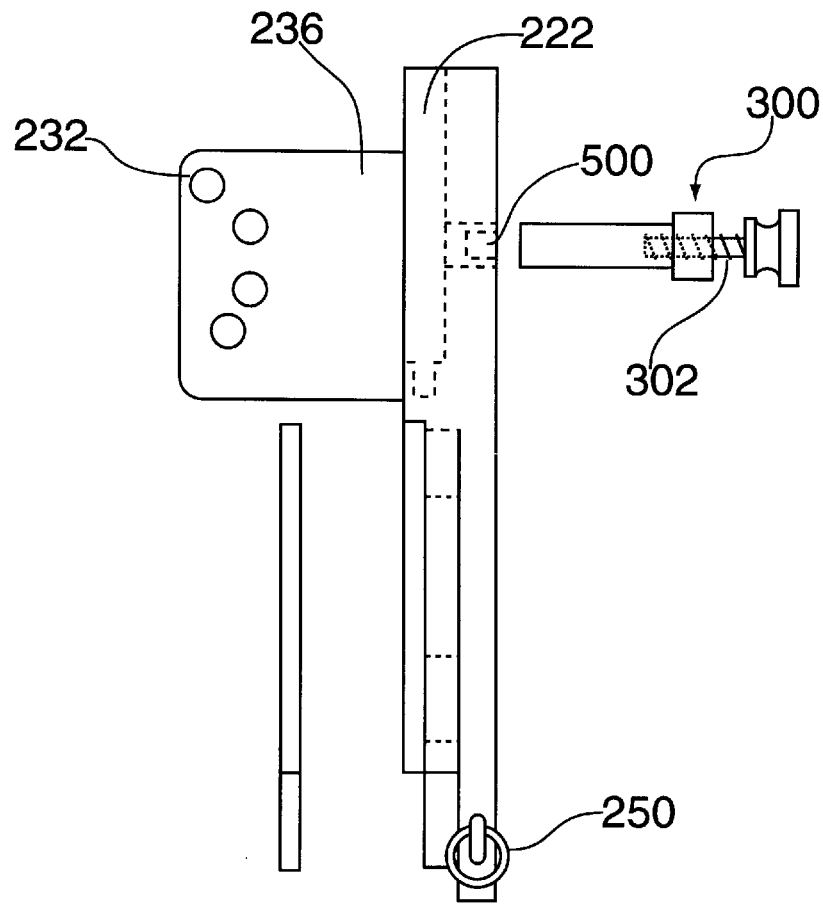
FIG. 5 illustrates a side view of the microphone holder of the present invention.
Figure 9:
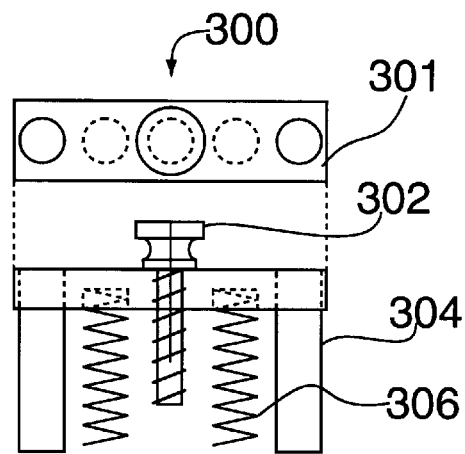
FIG. 9 illustrates the securing member of the holder of the present invention.

With the clip button 310 engaged within the elongated groove 222, the securing member 300 is applied to the back of the base 220 to firmly secure the microphone 200 into position. As shown in FIG. 3, FIG. 5 and FIG. 9, the securing member 300 comprises a substantially rectangular bar 301, a thumb screw 302, a pair of pins 304 and a pair of springs 306. The thumb screw 302, pins 304 and springs 306 are coupled to rectangular bar 301 as shown in FIG. 9. As thumb screw 302 is engaged with threaded bore 500, pins 304 pass through the base 220 via apertures 400 for fastening a microphone 200 to the base 220. Springs 306 are used to bias the rectangular bar 301. With a simple turn of the thumb screw 302, the pins 304 engage the microphone 200 and secure it to the microphone holder 100.

Figure 2:
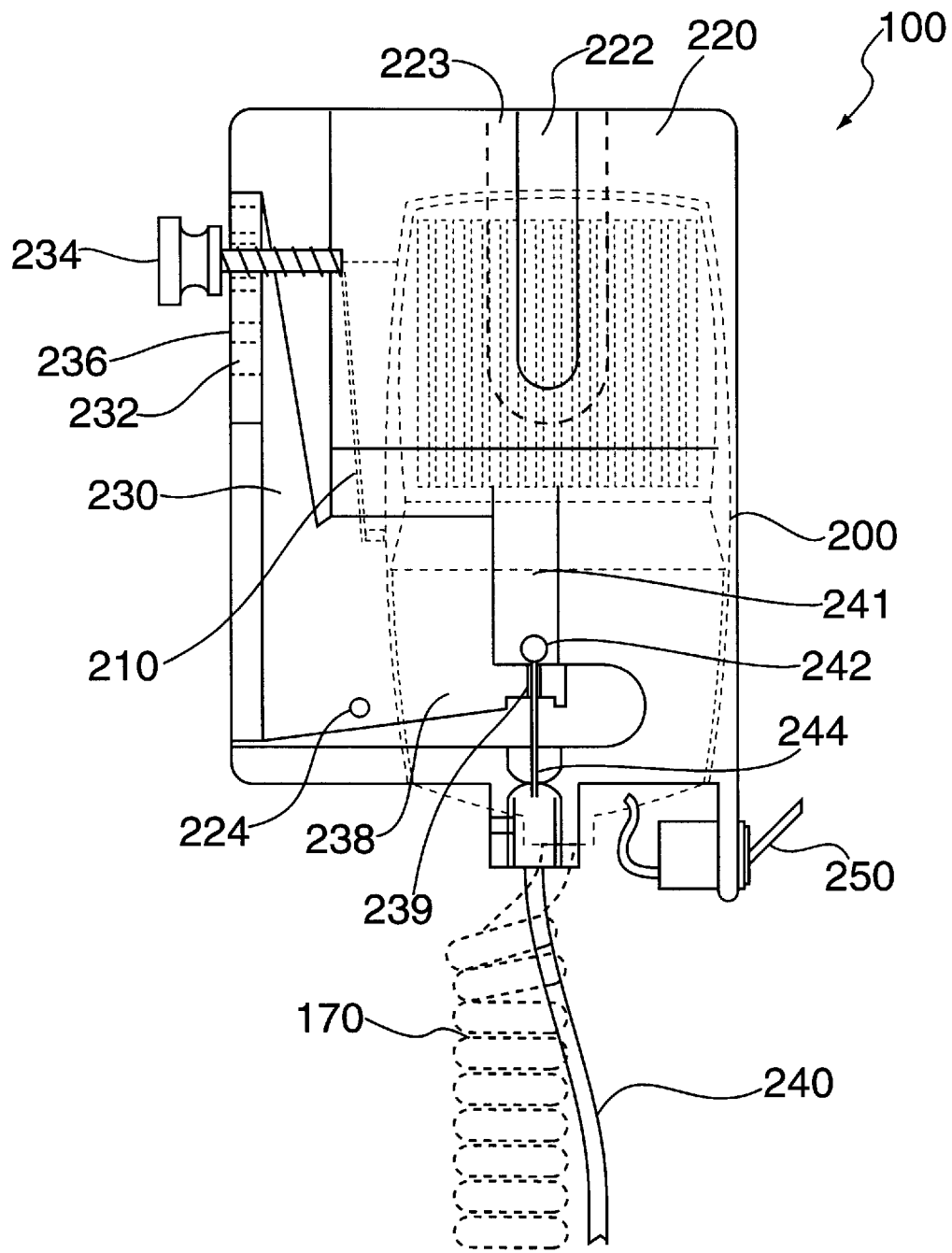
FIG. 2 illustrates a microphone mounted to the microphone holder of the present invention.
Figure 4:
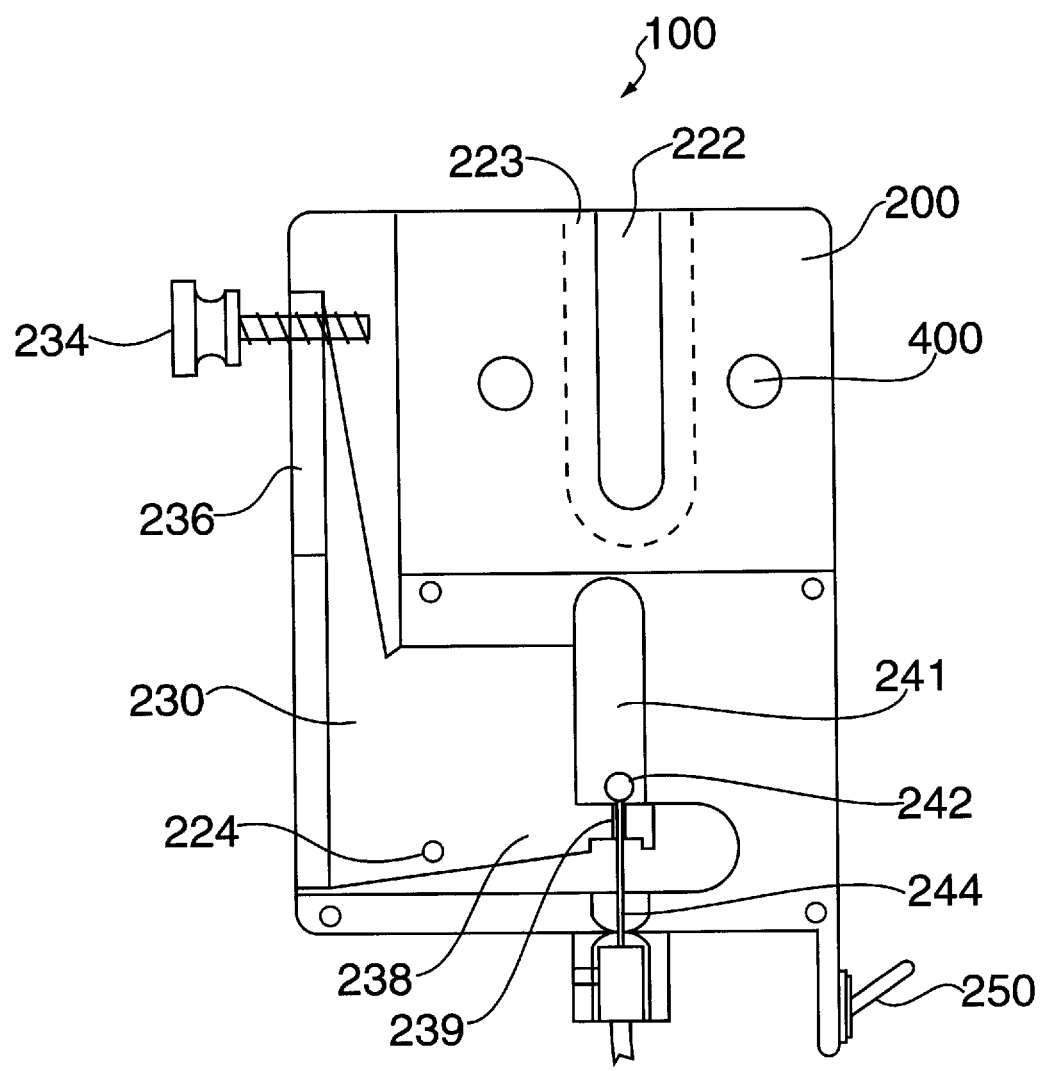
FIG. 4 illustrates the microphone holder of the present invention.
Figure 6A:
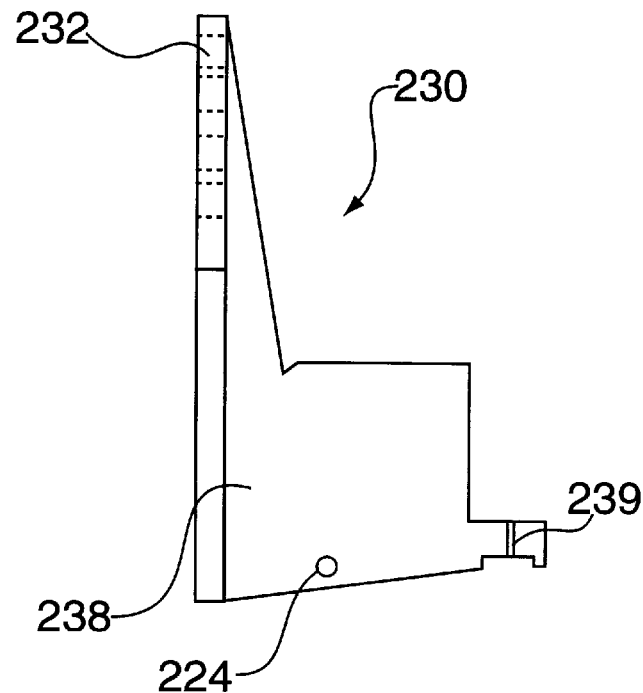
FIG. 6A illustrates the activator of the microphone holder of the present invention.
Figure 6B:
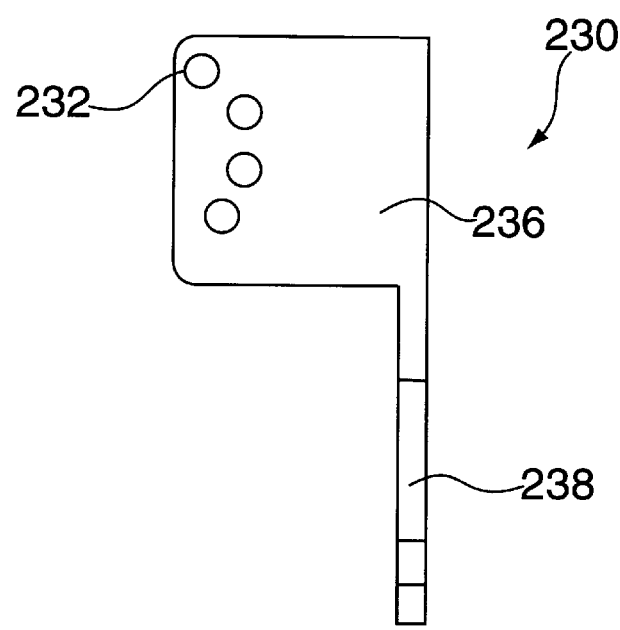
FIG. 6B illustrates a side view of the activator of the microphone holder of the present invention.

Referring to FIG. 2, FIG. 6A and FIG. 6B, the activator 230 is a L-shaped member for applying pressure to the trigger 210 of the microphone 200. The activator 230 comprises a screw 234, a strike portion 236, a pivot portion 238 and a pivot bore 224. The strike portion 236 extends perpendicularly from pivot portion 238. The strike portion 236 contains a plurality of threaded bores 232 for receiving the screw 234. This configuration of the activator 230 provides the flexibility of activating all current microphones. Through proper selection of an appropriate threaded bore 232, the screw can be properly adjusted (advanced or retracted) to engage any styles of trigger. Namely, the activator 230 is adjustable as to height, length and depth for engaging triggers of different sizes and shapes. Furthermore, the pivot portion 238 contains the pivot bore 224 and an anchor slot 239. The activator 230 is coupled to the base 220, where the activator 230 is free to rotate about pivot bore 224. The anchor slot 239 receives a wire 244 encased within a cable 240 with a rounded termination 242 positioned within adjustment channel 241 as shown in FIG. 2 and FIG. 4. By retracting the wire 244, the activator 230 is caused to rotate about pivot bore 224, thereby applying the screw 234 against the trigger 210.

Referring to FIG. 3, the base adapter 320 is positioned on the back of the base 220 for receiving one end of the flexible support member 110, The base adapter 320 is easily secured to the flexible support member 110 by applying a wingnut as discussed below with reference to FIG. 7.

In the preferred embodiment of the present invention, the base 220 of the microphone holder 100 further comprises a channel guard/private line switch 250. The channel guard switch 250 operates a channel isolation feature of a two-way radio 120. Specifically, when a microphone of a police radio is placed within its original holder, the channel isolation feature prevents the police radio from receiving transmissions from other police departments operating on the same channel. However, when the microphone is removed from the original holder, the channel isolation feature is typically deactivated and the police radio is free to receive all transmissions on a particular channel. Thus, the channel guard feature insulates a police officer from receiving extraneous transmissions. In order to preserve this important feature, the channel guard switch 250 provides a toggle to ground the microphone holder 100. This provides the same effect as if the microphone is placed within its original holder.

To illustrate, when a police officer is ready to transmit a message, he opens a channel by toggling the channel guard switch 250 to the "off" position. This action creates the same effect as removing the microphone from its original holder in the conventional prior art manner. At this point, the police radio is free to receive all transmissions on a particular channel. By depressing the foot-operated switch 130, the police officer is able to transmit a message. During pursuits, the channel guard switch 250 is generally placed in the "off" position in contrast with normal radio operation. The channel guard switch 250 effectively maintains the channel isolation feature of the police radio when the microphone 200 is transferred from its original holder to the universal microphone holder 100 of the present invention.

Figure 7:
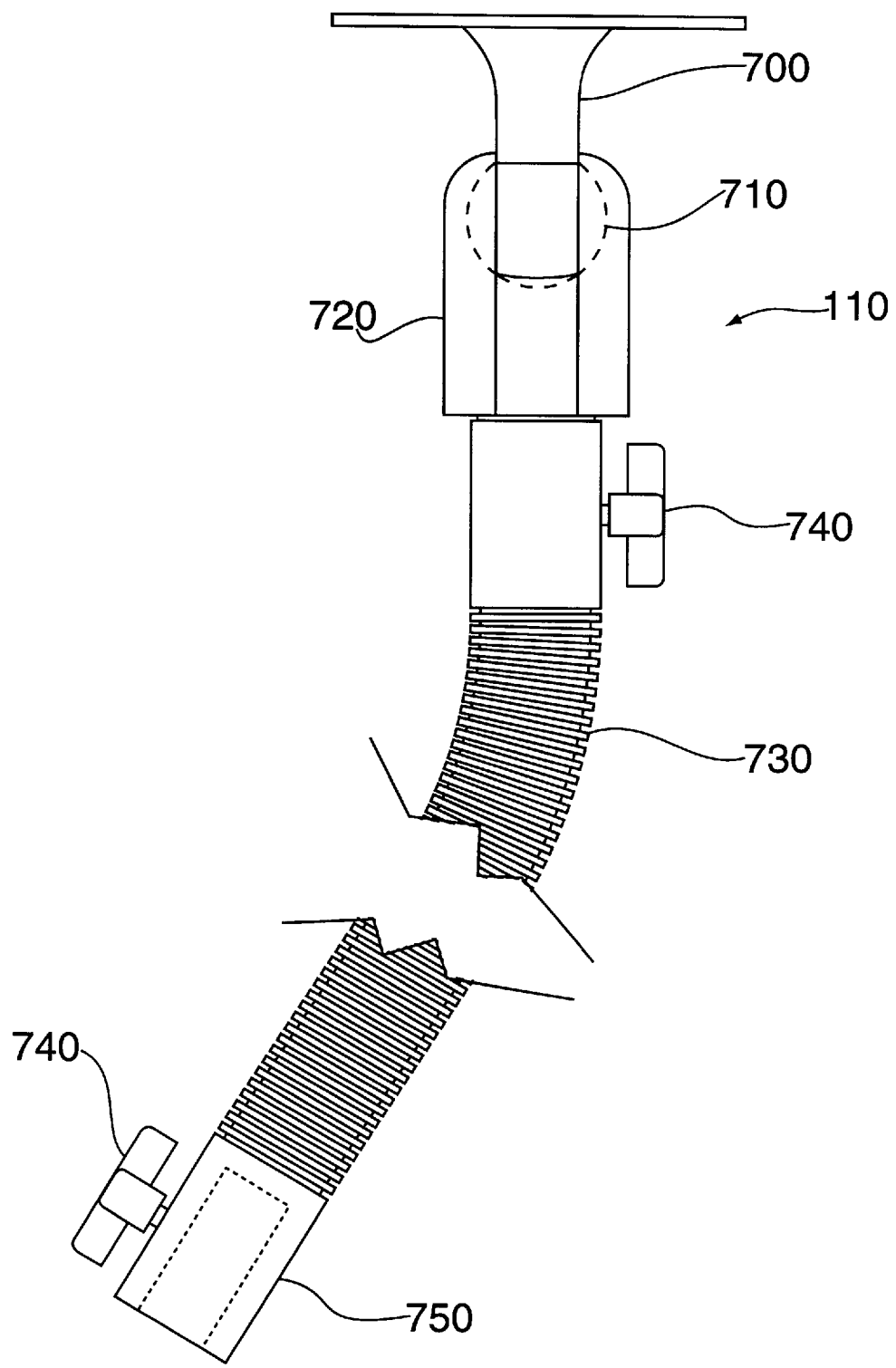
FIG. 7 illustrates the flexible support member of the present invention.

FIG. 7 depicts the flexible support member 110 of the present invention. Flexible support member 110 comprises a swivel base 700 and flexible shaft 730. The swivel base 700 incorporates a bracket (not shown) for adapting the swivel base 700 directly to the same location that the vehicle interior compartment light is located. However, those skilled in the art will clearly realize that the swivel base 700 can be mounted to different points within a vehicle to address different requirements. The swivel base 700 further comprises a ball 710 for engaging a plastic connector 720 to allow the flexible support member 110 to rotate (360°) about the swivel base 700.

Generally, the flexible shaft 730 is a tubular member constructed from a metal or plastic material having a substantial degree of rigidity and being sufficiently flexible to be adjusted into any desired position. Such flexible shaft is available from "Panavise" of Reno, Nev. The flexible shaft 730 contains connector 720, connector 750, and wing nuts 740. In the preferred embodiment of the present invention, connectors 720 and 750 are constructed from a plastic material to eliminate the problem of grounding. Connectors 720 and 750 are secured to the ball 710 of the swivel base 700 and the base adapter 320 respectively by wingnuts 740.

Figure 8:
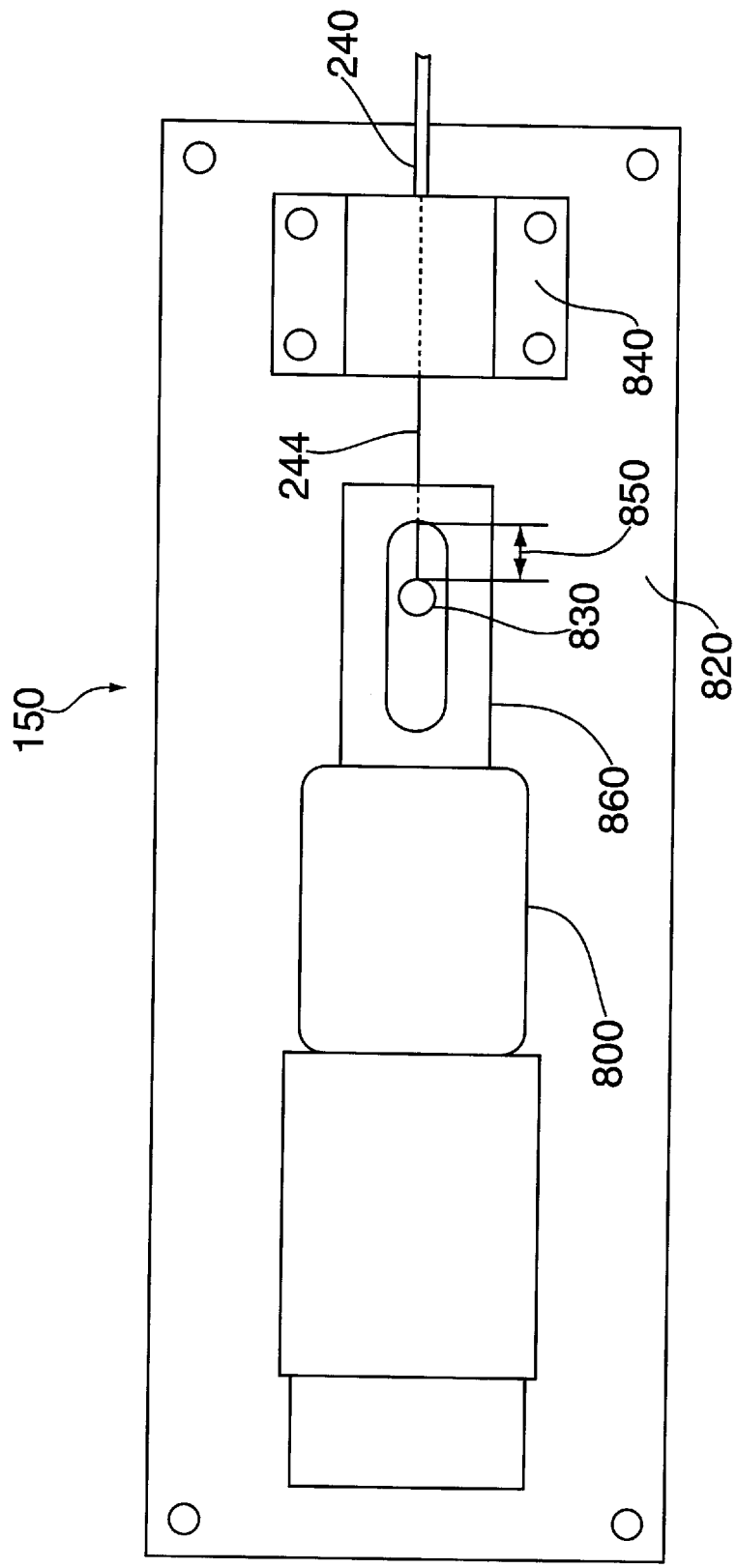
FIG. 8 illustrates the solenoid of the present invention.

FIG. 8 depicts the electrically-operated actuator 150 of the present invention. The electrically operated actuator 150 comprises a dual coil piston solenoid 800, an encased cable 240, an alignment connector 840 and mounting plate 820. The encased cable 240 having a wire 244 with a rounded termination 830 connects the solenoid 800 directly to the activator of the microphone holder. The wire 244 is coupled to an elongated U-shaped connector 860 through the alignment connector 840, which serves to hold the wire in alignment with the solenoid 800. When activated, the solenoid 800 retracts the wire 244 causing the activator to pivot on the base, thereby engaging the trigger of the microphone.

The solenoid of the present invention is available from "Synchro Start" of Chicago, Ill. The solenoid 800 generates approximately 25 pounds of pulling force which is sufficient to overcome the friction of moving the wire 244. The high pulling force provides the feature of concealing an extended encased cable in the side supports and/or roof of the interior passenger compartment. Generally, the use of an extended cable requires a higher pulling force to overcome the friction of moving the cable. However, in order to avoid overheating the solenoid and damaging the trigger 210 of the microphone 200 through excessive application of force, a "strike play" of one inch is provided. Namely, when the solenoid 800 is activated, there must be sufficient slack in the overall system to accommodate a movement of one inch. In the preferred embodiment of the present invention, the encased cable 240 is adjusted such that the movement of the activator 230 is limited to 0.25 inches. This is accomplished by providing a slack 850 of 0.75 inches within the U-shaped connector 860. Alternatively, a slack can be provided by adjusting the wire 244 within adjustment channel 241. However, those skilled in the art will clearly realize that different slack lengths can be employed to provide proper activation for different microphone configurations.

Furthermore, the solenoid 800 is mounted directly on the mounting plate 820 which is secured inconspicuously to the floor of a vehicle directly below a seat. An aluminum U-shaped cover (partially shown as 151 in FIG. 1) with a plurality of apertures is provided over the solenoid 800, U-shape connector 860 and alignment connector 840. The cover protects the actuator 150 from being damaged by items stored under the seat of the vehicle and yet provides the necessary ventilation to prevent overheating of the solenoid 800.

There has thus been shown and described a novel microphone mounting and control system. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A microphone mounting and control system for use in a vehicle having a passenger compartment, said system comprising:

holding means for holding a microphone having a trigger;

supporting means, coupled to said holding means, for supporting said holding means;

electrical actuator means, coupled to said holding means, for activating said trigger of said microphone, wherein said electrical actuator means comprises a solenoid and a cable, coupled between said solenoid and said holding means; and electrical switching means, coupled to said electrical actuator means, for activating said electrical actuator means.

2. The microphone mounting and control system of claim 1, wherein said electrical switching means comprises an electrical foot-operated switch.

3. The microphone mounting and control system of claim 2, wherein said electrical switching means further comprises an electrical hand-operated switch mounted within the passenger compartment of the vehicle.

4. The microphone mounting and control system of claim 1, wherein said supporting means comprises:

a flexible shaft; and a swivel base, coupled to said flexible shaft, for rotating said supporting means about said swivel base.

5. The microphone mounting and control system of claim 1, wherein said holding means comprises a channel guard switch.

6. The microphone mounting and control system of claim 1, wherein said holding means comprises a holder.

7. The microphone mounting and control system of claim 6, wherein said holder further comprises:

a base;

a channel guard switch a securing member, coupled to said base, said securing member having a pin for biasing said microphone to said base; and an activator, pivotally coupled to said base, for engaging said trigger.

8. A microphone mounting and control system for use in a vehicle having a passenger compartment, said system comprising:

a holder for holding a microphone having a trigger;

a support member, coupled to said holder, for suspending said holder within the passenger compartment;

an electrical actuator, coupled to said holder, for activating said trigger of said microphone, wherein said electrical actuator comprises a solenoid and a cable, coupled between said solenoid and said holder; and an electrical switch, coupled to said electrical actuator, for activating said electrical actuator.

9. The microphone mounting and control system of claim 8, wherein said electrical switch comprises an electrical foot-operated switch.

10. The microphone mounting and control system of claim 9, further comprising an electrical hand-operated switch, coupled to said electrical actuator, for activating said electrical actuator.

11. The microphone mounting and control system of claim 8, wherein said support member comprises a flexible shaft.

12. The microphone mounting and control system of claim 11, wherein said support member further comprises a swivel base, coupled to said flexible shaft, for rotating said support member about said swivel base.

13. The microphone mounting and control system of claim 8, wherein said holder further comprises:

a base;

a securing member, coupled to said base, said securing member having a pin for biasing said microphone to said base;

an activator, pivotally coupled to said base, for engaging said trigger; and a channel guard switch, coupled to said base, for activating a channel isolation feature of a radio.

14. A microphone holder, coupled to a support member, for holding a microphone having a trigger and a clip button, said holder comprising:

base means having a front side and a back side for holding the microphone;

activating means, pivotally coupled to said base means, for activating the trigger of the microphone, wherein said activating means comprises a plurality of bores and an engaging means, selectively coupled to one of said plurality of bores, for engaging the trigger of the microphone;

base adapter means, coupled to said base means, for receiving the support member; and securing means, coupled to said back side of said base means, for securing the microphone to said base means.

15. The microphone holder of claim 14, wherein said base means further comprises:

an elongated groove for slidably receiving the clip button of the microphone, said elongated groove having a restraining portion for limiting the movement of the microphone to a length of said elongated groove.

16. The microphone holder of claim 15, wherein sad engaging means is a screw.

17. A microphone mounting and control system for use in a vehicle having a passenger compartment, said system comprising:

a holder for holding a microphone having a trigger, wherein said holder comprises a base, a channel guard switch, an activator and a securing member, where said securing member, coupled to said base, has a pin for biasing said microphone to said base, and where said activator is pivotally coupled to said base, for engaging said trigger;

a support member, coupled to said holder, for supporting said holder;

an electrical actuator, coupled to said holder, for activating said trigger of said microphone; and an electrical switch, coupled to said electrical actuator, for activating said electrical actuator.

18. The microphone mounting and control system of claim 17, wherein said electrical switch comprises an electrical foot-operated switch.

19. The microphone mounting and control system of claim 18, wherein said electrical switch further comprises an electrical hand-operated switch mounted within the passenger compartment of the vehicle.

20. The microphone mounting and control system of claim 17, wherein said support member comprises:

a flexible shaft; and a swivel base, coupled to said flexible shaft, for rotating said support member about said swivel base.

* * * * *